United States Patent
Wang et al.

(10) Patent No.: US 7,815,721 B2
(45) Date of Patent: Oct. 19, 2010

(54) GAS FILTERING-BUFFERING DEVICE

(75) Inventors: Yaoxin Wang, Beijing (CN); Yangtian Zhang, Beijing (CN); Zhizhong Liang, Beijing (CN); Jin Lin, Beijing (CN); Zhongxia Zhang, Beijing (CN); Hua Peng, Beijing (CN); Yinong Liu, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 267 days.

(21) Appl. No.: 11/964,384

(22) Filed: Dec. 26, 2007

(65) Prior Publication Data

US 2008/0155946 A1    Jul. 3, 2008

(30) Foreign Application Priority Data

Dec. 31, 2006    (CN)    .................... 2006 1 0171614

(51) Int. Cl.
*B01D 53/04*    (2006.01)
*B01D 53/26*    (2006.01)

(52) U.S. Cl. .............................. 96/132; 96/134; 96/139; 96/413; 55/323

(58) Field of Classification Search .................. 96/121, 96/131, 132, 134, 137, 139, 138, 149, 151, 96/152, 413; 73/23.3, 31.05, 863.23; 55/320, 55/323
See application file for complete search history.

(56) References Cited

U.S. PATENT DOCUMENTS 3,464,186 A * 9/1969 Walker et al. .................. 96/115

3,577,988 A * 5/1971 Jones .................... 128/201.25
5,275,642 A * 1/1994 Bassine ....................... 96/149

(Continued)

FOREIGN PATENT DOCUMENTS

DE    43 18 021 C1    11/1994

(Continued)

OTHER PUBLICATIONS

Office Action from German Application No. 102007055925.0-52, dated Jun. 24, 2009.

*Primary Examiner*—Frank M Lawrence
(74) *Attorney, Agent, or Firm*—Westman, Champlin & Kelly, P.A.

(57) ABSTRACT

The present invention relates to a gas filtering-buffering device, which comprises at least one gas filtering unit; a gas inlet, the gas to be processed flows into the at least one gas filtering unit from the gas inlet; and a gas outlet, the gas processed by the at least one gas filtering unit is discharged out of the at least one gas filtering unit via the gas outlet, wherein the at least one gas filtering unit comprising: a gas buffering cavity for performing buffering function for the gas, and a gas filtering part for performing filtering function for the gas. In the present invention, it is not only provided with a gas filtering part which is able to filter the moisture and organic substance in the gas, but also provided with a gas buffering cavity, which integrate the filtering and buffering functions together. The buffering cavity may expand the capacity and stabilize the pressure of the gas, and balance the concentration, pressure and flow rate of the gas, it is advantageous to reduce the on-way pressure lost and partially pressure lost, decrease fluctuation of the flow current and the pressure thus, the detecting performance of the detector is improved.

18 Claims, 2 Drawing Sheets

U.S. PATENT DOCUMENTS

| | | | |
|---|---|---|---|
| 5,387,406 A | 2/1995 | Ruoff | 423/210 |
| 5,879,631 A * | 3/1999 | Wewers et al. | 422/98 |
| 6,484,413 B1 * | 11/2002 | Larsson | 34/80 |
| 6,503,301 B2 * | 1/2003 | Uchino et al. | 96/132 |
| 6,695,896 B2 * | 2/2004 | Hara et al. | 96/121 |
| 7,008,470 B2 * | 3/2006 | Makino et al. | 96/131 |
| 7,097,697 B2 * | 8/2006 | Nakamura et al. | 96/134 |
| 7,458,367 B2 * | 12/2008 | Kasuya | 123/519 |
| 2004/0103625 A1 | 6/2004 | Nakano et al. | 55/385.2 |
| 2006/0201119 A1 | 9/2006 | Song | 55/471 |

FOREIGN PATENT DOCUMENTS

| | | |
|---|---|---|
| DE | 692 09 515 T2 | 10/1996 |
| WO | WO 03/066185 | 8/2003 |
| WO | WO 2005/023390 | 3/2005 |

\* cited by examiner

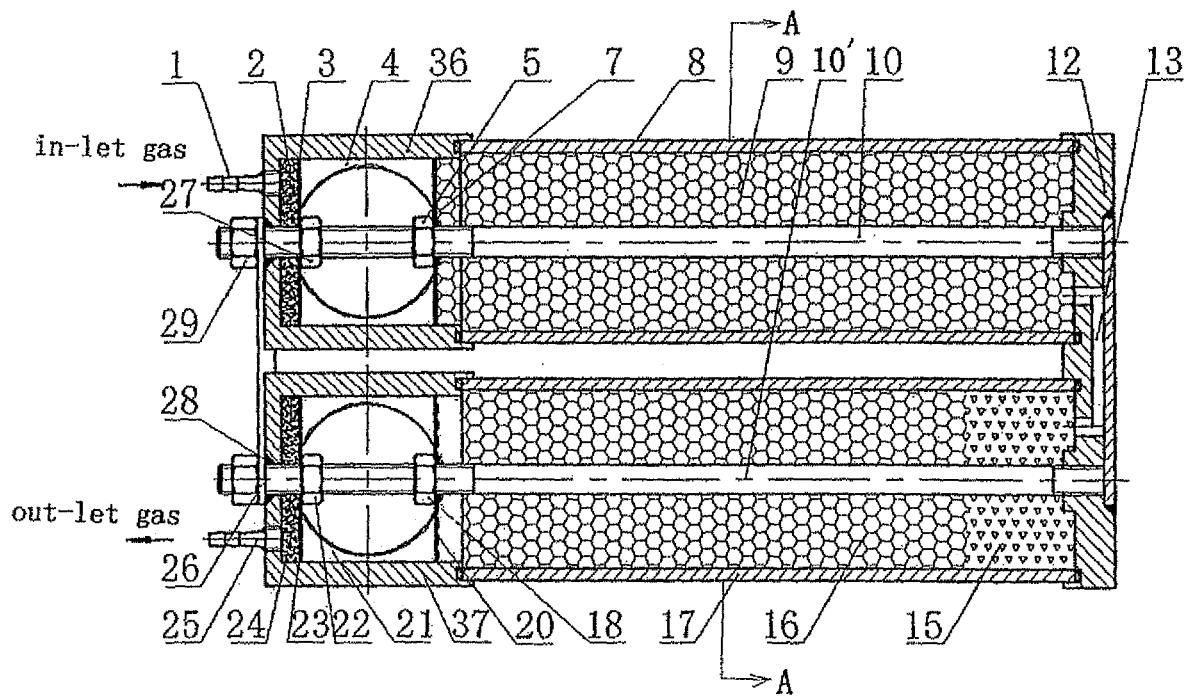
FIG. 3
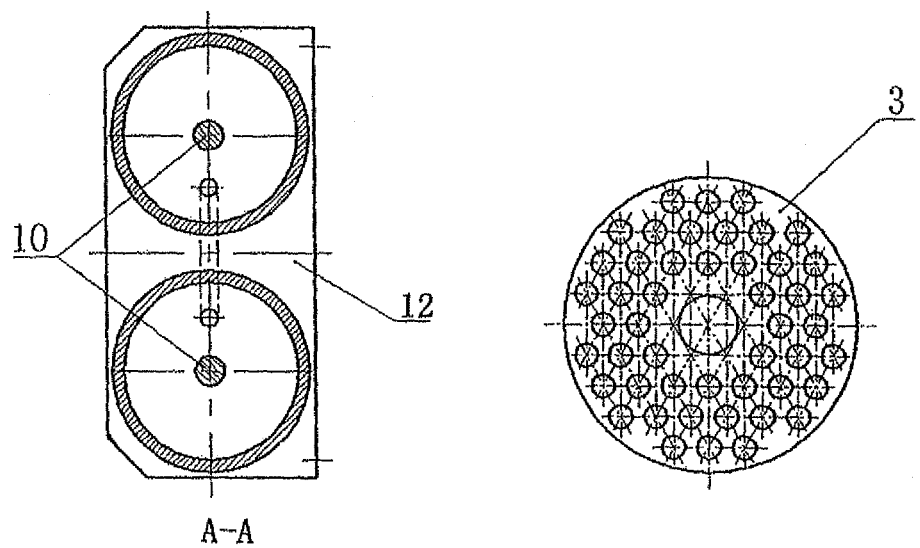
A-A
FIG. 4
FIG. 5

GAS FILTERING-BUFFERING DEVICE

The present application claims priority of Chinese patent application Serial No. 200610171614.1, filed Dec. 31, 2006, the content of which is hereby incorporated by reference in its entirety.

FIELD OF INVENTION

The present invention relates to a gas filtering device, more particularly, to an integrated device, which used in a trace detector for detecting explosives and drugs, to filtrate and buffer the migrated gas and reacted gas.

BACKGROUND OF INVENTION

In conventional arts, a filter used in a trace detector for detecting explosives and drugs only has effects in filtering water, organic substances and absorbable particles in the migrated gas and reacted gas. Filter medium is filled in the whole inner space of the filter. Due to the sucking action from the gas source, the migrated gas in the flow path of the detector passes through the filter before entering into the migrated pipe. Because of the on-way pressure lost and partially pressure lost of the gas flow caused by the filter, as well as the uncertainty of the arrangement of the particle filter medium and the effects of the inner structure of the filter, the flow current and the pressure of the passing gas is fluctuated. Thus, the detecting performance of the detector is affected and the detecting precision is decreased.

SUMMARY OF INVENTION

One object of the present invention is to overcome at least one aspect of the limitation and shortages existing in the arts.

Accordingly, one object of the present invention is to provide a gas filtering-buffering device, which is able to provide filtering function and buffering function to the gas to be processed, thus, the detection precision of a trace detector is improved.

According to one aspect of the present invention, there is provided a gas filtering-buffering device which comprises, at least one gas filtering unit; a gas inlet, the gas to be processed flows into the at least one gas filtering unit from the gas inlet; and a gas outlet, the gas processed by the at least one gas filtering unit is discharged out of the at least one gas filtering unit via the gas outlet, wherein the at least one gas filtering unit comprising: a gas buffering cavity for performing buffering function for the gas, and a gas filtering part for performing filtering function for the gas.

In one embodiment, the at least one gas filtering unit includes: a first gas filtering unit and a second gas filtering unit connected hermetically and in series, wherein the first gas filtering unit including a first gas buffering cavity and a first gas filtering part, and the second gas filtering unit including a second gas buffering cavity and a second gas filtering part.

Preferably, the first gas filtering unit and the second gas filtering unit are connected by a connection unit, the connection unit is provided with a flow passage through which the gas from the first gas filtering unit flows into the second gas filtering unit.

Furthermore, the first gas filtering unit, the connection unit and the second filtering unit may be configured to have a substantial U-shape. Alternatively, the connection unit may be integrated with the first gas filtering unit and the second filtering unit.

In a further embodiment, the first gas buffering cavity is provided at the upstream of the first gas filtering part in a gas flow direction; and the second gas buffering cavity is provided at the downstream of the second gas filtering part in the gas flow direction.

Preferably, the first gas filtering part has a moisture filter medium layer; and the second gas filtering part having an organic substance filter medium layer and an absorbing filter medium.

Preferably, the gas filtering-buffering device further comprises: a first porous filter medium baffle provided between the first gas buffering cavity and the moisture filter medium layer; and a second porous filter medium baffle provided between the second gas buffering cavity and said organic substance filter medium layer and absorbing filter medium layer.

Preferably, the gas filtering-buffering device further comprises: a first precise filtering layer provided between the gas inlet and the first gas buffering cavity; and a second precise filtering layer provided between the gas outlet and the first gas buffering cavity.

Preferably, the gas filtering-buffering device further comprises: a first precise filtering layer baffle provided between the first precise filtering layer and the first gas buffering cavity; and a second precise filtering layer baffle provided between the second precise filtering layer and the second buffering cavity.

Alternatively, the gas filtering-buffering device further comprises: a first adjusting member provided in the first gas buffering cavity for adjusting the precision of the moisture filter medium layer; and a second adjusting member provided in the second gas buffering cavity for adjusting the precision of the organic substance filter medium layer and the absorbing filter medium layer.

Alternatively, the gas filtering-buffering device further comprises: a third adjusting member provided in the first gas buffering cavity for adjusting the filtering precision of the first precise filtering layer; and a forth adjusting member provided in the second gas buffering cavity for adjusting the filtering precision of the second precise filtering layer.

Alternatively, the gas filtering-buffering device further comprises: a first draw bar penetrating through the first filtering unit and connecting the first gas filtering unit and the connection unit; and a second draw bar penetrating through the second filtering unit and connecting the second gas filtering unit and the connection unit.

Alternatively, the first adjusting member is a nut, which is engaged with a first threaded portion provided on the first draw bar and movable along with the first draw bar, so that the filtering precision of the moisture filter medium layer is adjusted by moving the first porous filter medium baffle; and the second adjusting member is a nut, which is engaged with a second threaded portion provided on the second draw bar and movable along with the second draw bar, so that the filtering precision of the organic substance filter medium layer and the absorbing filter medium layer are adjusted by moving the second porous filter medium baffle.

Alternatively, the third and forth adjusting member are nuts, which are engaged with third and forth threaded portions and movable along with the first and second draw bars, respectively, so that the filtering precision of the first and second precise filtering layers are adjusted by moving the first and second precise filtering layer baffle.

In one embodiment, the gas filtering-buffering device further comprises: a first opening and a second opening provided at the first and second gas buffering cavity; and a first cover member and a second cover member movably connected to and closed the first and second openings. Preferably, sealing members are respectively provided between the first and second openings and the first and second cover members.

In an embodiment, each of the first and second gas filtering units may have an integrated structure.

In an embodiment, each of the first and second gas filtering units includes a cartridge filter and a cartridge filter cover connected hermetically with each other, respectively; and each of the first and second gas buffering cavities is provided within the cartridge filter cover, respectively.

The advantage of at least one aspect of one embodiment and the positive effects are:

In the present invention, it is not only provided with a gas filtering part which is able to filter the moisture and organic substance in the gas, but also provided with a gas buffering cavity, which integrate the filtering and buffering functions together. The buffering cavity may expand the capacity and stabilize the pressure of the gas, and balance the concentration, pressure and flow rate of the gas. Also it is advantageous to reduce the on-way pressure lost and partially pressure lost, decrease fluctuation of the flow current and the pressure thus, the detecting performance of the detector is improved.

BRIEF DESCRIPTION OF THE DRAWING

FIG. 3 is section view of the gas filtering-buffering device of the present invention;

FIG. 4 is a cross-sectional view taken along with line A-A of FIG. 3; and

FIG. 5 is a schematic view of the structure of the precise filtering layer baffle in the present invention.

In drawings, wherein:

Figure 1:
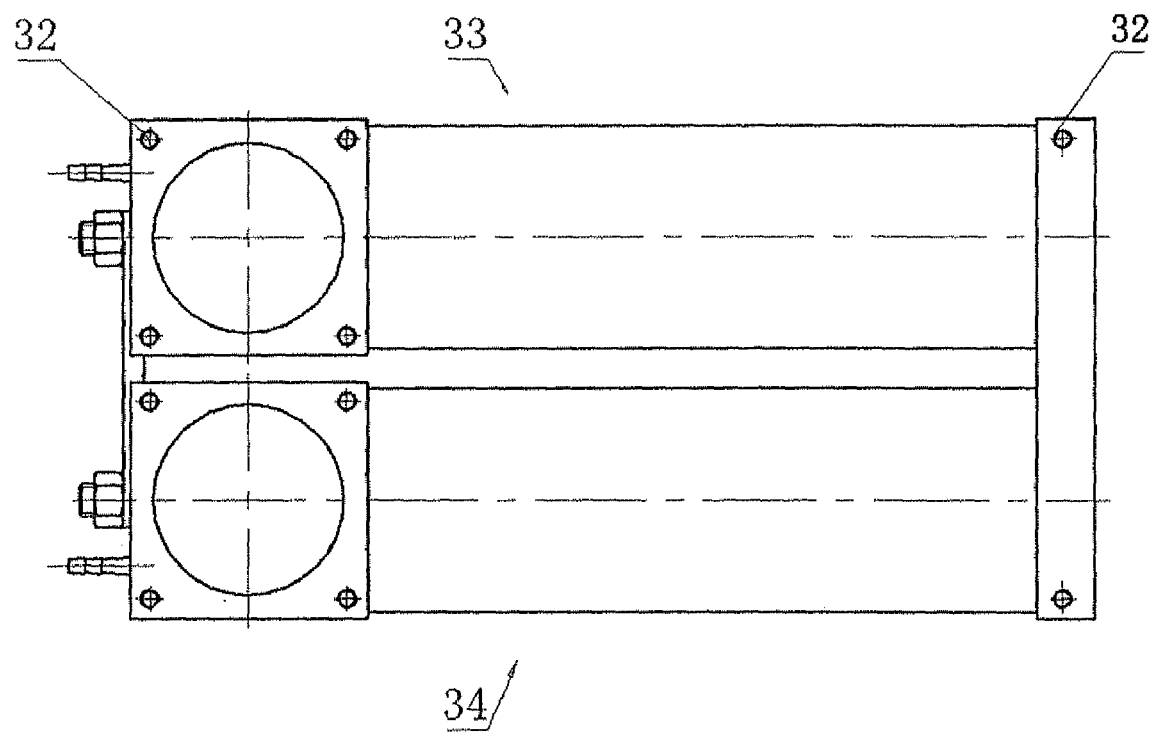
FIG. 1 is front view of the gas filtering-buffering device of the present invention.

1. gas inlet; 2. precise filtering layer; 3. precise filtering layer baffle; 4. inlet-gas buffering cavity; 5. adjusting nut; 7. porous filter medium baffle; 8. first cartridge filter; 9. moisture filter medium layer; 10. central draw bar; 12. built-in passage end plate; 13. built-in passage; 15. absorbing filter medium layer; 16. organic substance filter medium layer; 17. second cartridge filter; 20. porous padding baffle; 21. outgas buffering cavity; 23. outlet precise filtering layer baffle; 24. outlet precise filtering layer; 25 gas outlet; 26. fixed distance sealing pressure plate; 28. sealing ring; 29. locking nut; 30. sealing ring; 31. rotary cover; 32. mounting screw hole; 33. first filter; 34. second filter; 36. first cartridge filter; 37 second cartridge cover.

DETAILED DESCRIPTION OF THE PREFERRED EMBODIMENTS

Preferred embodiments of the present invention will be described hereinafter in detail with reference to the attached drawings, wherein the like reference numerals refer to the like elements throughout the specification. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

As shown in FIGS. 1-4, a gas filtering-buffering device comprises a first filter 33 which serves as the first filtering unit, and the second filter 34 which serves as the second filtering unit, the first filter 33 and the second filter 34 are connected hermetically with each other and in series. The first filter 33 is provided therein with an inlet-gas buffering cavity 4 as a first gas buffering cavity and an inlet-gas filtering part as a first gas filtering part, and the second filter 34 is provided therein with an outgas buffering cavity 21 as a second gas buffering cavity and an outgas filtering part as a second gas filtering part. The gas filtering-buffering device further comprises a gas inlet 1 provided at the one end of the first filter 33, the gas to be processed flows into the first filter 33 through the gas inlet 1, and a gas outlet 25 provided at the one end of the second filter 34, the gas processed by above filter is discharged out of the second filter 34 via the gas outlet 25. As shown in FIG. 3, the inlet-gas buffering cavity 4 is provided at the upstream of the first gas filtering part in a gas flow direction, the outgas buffering cavity 21 is provided at the downstream of the second gas filtering part in the gas flow direction. Although in the above embodiment, the gas filtering-buffering device includes the first filter 33 serving as the first filtering unit and the second filter 33 serving as the second filtering unit, the present invention is not limited thereto. Specifically, the gas filtering-buffering device of the present invention also can only have one filter, and a gas inlet and a gas outlet provided at both end of the filter.

Refer to FIG. 3, the first filter includes a first cartridge filter 8 having a substantially cylindrical shape, a first cartridge cover 36 provided at the left end of the first cartridge filter 8 and hermetically engaged with the first cartridge filter 8. The second filter includes a second cartridge filter 17 having a substantially cylindrical shape, and the second cartridge cover 37 provided at the left end of the second cartridge filter 17 and hermetically engaged with the second cartridge filter 17. Although, the first and second cartridge filters in the embodiment have a substantially hollow cylindrical shape, the present invention is not limited thereto, any other desirable shape also can be applied, for example, hollow cube shape. Furthermore, although in the above embodiment, the first filter 33 is structured of two separated parts consisting of the first cartridge filter 8 and the first cartridge cover 36 which are hermetically engaged with each other, the second filter 34 is structured of two separated parts consisting of the second cartridge filter 17 and the second cartridge cover 37 which are hermetically engaged with each other, the present invention is not limited thereto. In particular, the first filter 33 and the second filter 34 also may be formed integrally.

An built-in passage end plate 12 serving as a connection unit is hermetically provided at the right end of the first cartridge filter 8 and the second cartridge filter 17, an built-in passage 13 is in communication with the first cartridge filter 8 and the second cartridge filter 17 is provided inside the built-in passage end plate 12. In one embodiment, the built-in passage end plate 12 is configured to be separated parts, as shown in FIG. 1, which is hermetically connected with the filters 33, 34 by draw bars 10, 10'. However, the present invention is not limited thereto, for example, the built-in passage end plate 12 also can be configured to have an integrated structure with the first filter 33 and the second filter 34.

Furthermore, the gas filtering-buffering device further includes a first draw bar 10 penetrating through the first filter 33 and connected with the first filter 33 and the built-in passage end plate 12, and a second draw bar 10' penetrating through the second filter 34 and connected with the second filter 34 and the built-in passage end plate 12.

In one embodiment, the first filter 33 is constructed of two separated parts consisting of the first cartridge filter 8 and the first cartridge cover 36 which are hermetically engaged with each other, the central draw bars 10, 10' are provided separately between the first cartridge cover 36 and the second cartridge cover 37 and the built-in passage end plate 12. In one embodiment, both two central draw bars 10, 10' are extended out of the first cartridge cover 36 and the second cartridge cover 37, and locked by two locking nuts 29 respectively. Apparently, two central draw bars 10, 10' also can be provided to locate inside of the first filter 33 and second filter 34 so as to connect both inner ends of the first filter 33 and second filter 34.

Figure 2:
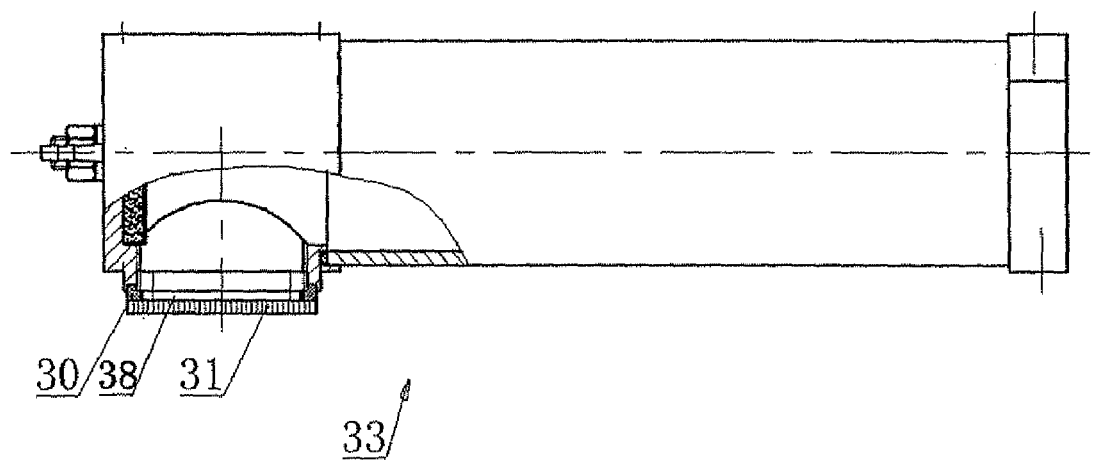
FIG. 2 is top view of FIG. 1.

As shown in FIG. 2, in one embodiment, a fixed distance sealing pressure plate 26 is connected at the left end of two central draw bars 10, 10'. The fixed distance sealing pressure plate 26 is pressed at the outside of the first cartridge cover 36 and the second cartridge cover 37 by locking nuts 29. Sealing rings 28 set on the central draw bars are provided between the fixed distance sealing pressure plate 26 and the first and second cartridge covers 36, 37, and all the parts are tightly fitted together by the rotating locking nut 29 tightly to achieve the gas tightness in the flow path.

In the embodiment shown in FIG. 2, the gas inlet 1 is provided on the first cartridge cover 36, the inlet-gas buffering cavity 4 is provided inside the first cartridge cover 36. The inlet-gas filtering part includes a porous filter medium baffle 7 provided at the right side of the inlet-gas buffering cavity 4 and moisture filter medium layer 9 provided inside the first filter 8. The porous filter medium baffle 7 is used for maintaining and blocking moisture filter medium layer 9, to prevent it from overflowing into the inlet-gas buffering cavity. The primary function of the moisture filter medium layer 9 is to remove the moisture in the gas, and the main component thereof may be of color silica gel.

In one embodiment, the first filter 33 further includes a precise filtering layer provided at the left side of the inlet-gas buffering cavity 4, that is, between the inlet-gas buffering cavity 4 and the gas inlet 1, and a precise filtering layer baffle 3 used for blocking and maintaining a precise filtering layer 2. The primary purpose of the precise filtering layer 2 is to filter the dust etc. which has entered into the gas filtering-buffering device, and the main component thereof may be absorbent cotton.

In the embodiment shown in FIG. 2, the gas outlet 25 is provided on the second cartridge cover 37, the outgas buffering cavity 21 is provided inside the second cartridge cover 37. The outgas filtering part is constructed by the porous padding baffle 20 at the right side of the outgas buffering cavity 21, the organic substance filter medium layer 16 and/or absorbing filter medium layer 15 inside the second cartridge filter 17. The porous padding baffle 20 is used to maintain and block the organic substance filter medium layer 16 and/or absorbing filter medium layer 15, in order to prevent them from overflowing into the inlet-gas buffering cavity 4. The primary function of the organic substance filter medium layer 16 and/or absorbing filter medium layer 15 is to absorb the particles, and the essential component thereof may be such as active carbon or molecular sieve.

In an embodiment, the second filter 34 further includes an outgas precise filtering layer and an outgas precise filtering layer baffle provided at the left side of the outgas buffering cavity 21, that is, a position between the outgas buffering cavity 21 and the gas outlet 25. The primary purpose of the precise filtering layer 24 is to filter the filtering stuff component etc. mixed into the gas, and the essential component may be such as absorbent cotton.

Refer to FIGS. 1 and 2, the gas filtering-buffering device further comprises: first and second gas openings 38,38 provided at the first and second gas buffering cavity 4, 21; and first and second rotary covers 31, 31 movably connected onto and closing the first and second openings 38,38. In the embodiment shown in FIG. 2, the first cartridge cover 36 and the second cartridge cover 37 are provided with rotary covers 31, 31 corresponding to the inlet-gas buffering cavity 4 and the outgas buffering cavity 21, respectively. Sealing rings 30 are provided respectively between two rotary covers 31, 31 and the first cartridge cover 36 and the second cartridge cover 37. The rotary covers 31 may be connected with the cartridge covers 36, 37 by threaded connection. Furthermore, a number of screw holes 32 for fixing and mounting the whole filter are provided respectively on the first cartridge cover 36, the second cartridge cover 37, and the built-in passage end plate 12.

Hereafter, each filter medium baffle according to the embodiment of the present invention will be described in accordance with FIG. 5. As mentioned in FIG. 5, the precise filtering layer baffle 3 in the present invention may be a circular-shaped porous baffle, the porous filter medium baffle 7, the porous padding baffle 20, the outgas precise filtering layer baffle 23 and the precise filtering layer baffle 3 have a similar structure, these four baffles are freely mounted on the corresponding central draw bars 10, 10' in series, respectively, wherein nuts 5, 18, 22, and 27 for adjusting their positions are provided within the inlet-gas buffering cavity 4 and outgas buffering cavity 21. In particular, screw-threads, which incorporate with above nuts 5, 18, 22 and 27, are provided onto a proper location of the central draw bars 10, 10', so that nuts 5, 18, 22 and 27 may be moved along central draw bars 10, 10', therefore, the filtering precision of each filtering layer may be adjusted by moving each filter medium baffle 3, 7, 20, 23.

When it is required to adjust the precision of each filtering layer in above, the user opens the rotary cover 31 first, and then wrenches the nuts 5, 18, 22 and 27 engaged with the central draw bars 10, 10', so that each filter medium baffles 3, 7, 20, 20 may be moved along the central draw bars 10, 10', thus, the filtering precision of precise filtering layers and the capacity of the buffering cavities can be adjusted. Furthermore, the replacement of the filter medium in the first and second filters 33, 34 also can be achieved through above operation.

More particularly, in the present invention, the filter medium in the moisture removing cavity can be compacted by adjusting the position of the porous filter medium baffle 7 at one side of the moisture filter medium layer 9. At the same time, the capacity of the inlet-gas buffering cavity is controlled by changing the position of the porous filter medium baffle 7, and the position of the porous filter medium baffle 7 on the central draw bar 10 may be adjusted by the adjusting nut 5.

The absorbing filter medium 15 and the organic substance filter medium layer 16 filled inside of the second cartridge filter 17 are organic substance padding, the filter medium in the second cartridge filter 17 is compacted by adjusting the position of the porous padding baffle 20 at one side of the organic substance filter medium. At the same time, the capacity of the outgas buffering cavity is controlled by changing the position of the porous padding baffle 20, the position of the porous padding baffle 20 on the central draw bar 10' is adjusted by nut 18.

The inlet-gas precise filtering layer 2 is a fiber filtering layer, and it is closely pasted on an inner wall close to the gas inlet side in the inlet-gas buffering cavity, the inlet-gas precise filtering layer baffle 3 is provided at the outside thereof and mounted on the central draw bar 10 in series, a pretension nut 27 is located at the outside of the inlet-gas precise filtering layer baffle 3 on the central draw bar, the degree of tightness of the inlet-gas precise filtering layer baffle 3 is varied by adjusting the pretension nut 27, so that the precision of the filtering is changed.

The outgas precise filtering layer 24 is a fiber filtering layer, and it is closed pasted on an inner wall close to the gas outlet 25 side in the outgas buffering cavity, the outgas precise filtering layer baffle 23 is provided at the outside thereof and mounted on the central draw bar 10' in series, a pretension nut 22 is located at the outside of the outgas precise filtering layer baffle 23, the degree of tightness of the outgas precise filtering layer baffle 23 is varied by adjusting the pretension nut, so that the precision of the filtering is changed.

In the gas filtering-buffering device of the present invention, there can be three or more gas filtering units as required by the determination of the precision of filtering and so on.

When the gas filtering-buffering device of the present invention operates normally, the gas to be processed is entered into the first filter 33 via the gas inlet 1. The primary purification is obtained through the primary filtering by the inlet-gas precise filtering layer 2. When the gas flows into the first filter 33 through the gas inlet with a smaller drift diameter, the flow rate of the gas become extremely fast and it is easy to form turbulent flow. Thus after the gas is purified through the inlet-gas precise filtering layer, first of all, the gas may be processed with expanded capacity, stabilized pressure, and balanced the concentration, the pressure and the rate of the gas in the inlet-gas buffering cavity 4, then it flows into the first cartridge filter 8 to subject to a moisture removing process by passing through the porous filter medium baffle 7; and then, the gas flows into the second filter 34 via the built-in passage 13, firstly, inside the second cartridge filter 17, the organic substance in the gas is removed by filtration, and particles in the gas are absorbed, and then, the gas may be processed with expanded capacity, stabilized pressure, and balanced the concentration, the pressure and the rate of the gas by flowing into the outgas buffering cavity 21 through the porous padding baffle, then, the gas is purified by the outgas precise filtering layer 24 and discharged by gas outlet 26.

It would be appreciated by those skilled in the art that many modifications, alterations and substitutions may be made in these embodiments without departing from the principles and spirit of the invention, the scope of which is defined in the claims and their equivalents.

What is claimed is:

1. A gas filtering-buffering device, comprising:
   at least one gas filtering unit;
   a gas inlet, the gas to be processed flows into the at least one gas filtering unit from the gas inlet; and
   a gas outlet, the gas processed by the at least one gas filtering unit is discharged out of the at least one gas filtering unit via the gas outlet,
   wherein the at least one gas filtering unit comprising: a first gas filtering unit and a second gas filtering unit connected hermetically and in series, wherein the first gas filtering unit including a first gas buffering cavity and a first gas filtering part, and the second gas filtering unit including a second gas buffering cavity and a second gas filtering part,
   wherein the first and second gas buffering cavities are used for performing buffering function for the gas, and the first and second gas filtering part are used for performing filtering function for the gas, wherein:
   a first precise filtering layer is provided between the gas inlet and the first gas buffering cavity; and
   a second precise filtering layer is provided between the gas outlet and the second gas buffering cavity.

2. The gas filtering-buffering device of claim 1, wherein:
   the first gas filtering unit and the second gas filtering unit are connected by a connection unit,
   the connection unit is provided with a flow passage through which the gas from the first gas filtering unit flows into the second gas filtering unit.

3. The gas filtering-buffering device of claim 2, wherein:
   the first gas filtering unit, the connection unit and the second gas filtering unit are configured to have a substantial U-shape.

4. The gas filtering-buffering device of claim 3, wherein:
   the connection unit can be integrated with the first gas filtering unit and the second gas filtering unit.

5. The gas filtering-buffering device of claim 3, wherein:
   the first gas buffering cavity is provided at the upstream of the first gas filtering part in a gas flow direction; and
   the second gas buffering cavity is provided at the downstream of the second gas filtering part in the gas flow direction.

6. The gas filtering-buffering device of claim 5, wherein
   the first gas filtering part has a moisture filter medium layer; and
   the second gas filtering part has an organic substance filter medium layer for filtering out organic substance and/or an absorbing filter medium layer.

7. The gas filtering-buffering device of claim 6, further comprising:
   a first porous filter medium baffle provided between the first gas buffering cavity and the moisture filter medium layer; and
   a second porous filter medium baffle provided between the second gas buffering cavity and said organic substance filter medium layer for filtering out organic substance and/or absorbing filter medium layer.

8. The gas filtering-buffering device of claim 1, further comprising:
   a first precise filtering layer baffle provided between the first precise filtering layer and the first gas buffering cavity; and
   a second precise filtering layer baffle provided between the second precise filtering layer and the second gas buffering cavity.

9. The gas filtering-buffering device of claim 7, further comprising:
   a first adjusting member provided in the first gas buffering cavity for adjusting the precision of the moisture filter medium layer; and
   a second adjusting member provided in the second gas buffering cavity for adjusting the precision of the organic substance filter medium layer and/or the absorbing filter medium layer.

10. The gas filtering-buffering device of claim 8, further comprising:
    a third adjusting member provided in the first gas buffering cavity for adjusting the filtering precision of the first precise filtering layer; and
    a forth adjusting member provided in the second gas buffering cavity for adjusting the filtering precision of the second precise filtering layer.

11. The gas filtering-buffering device of claim 9, further comprising:
    a first draw bar penetrating through the first gas filtering unit and connecting the first gas filtering unit and the connection unit; and
    a second draw bar penetrating through the second gas filtering unit and connecting the second gas filtering unit and the connection unit.

12. The gas filtering-buffering device of claim 10, further comprising:
    a first draw bar penetrating through the first gas filtering unit and connecting the first gas filtering unit and the connection unit; and a second draw bar penetrating through the second gas filtering unit and connecting the second gas filtering unit and the connection unit.

13. The gas filtering-buffering device of claim 11, wherein:
the first adjusting member is a nut, which is engaged with a first threaded portion provided on the first draw bar and movable along with the first draw bar, so that the filtering precision of the moisture filter medium layer is adjusted by moving the first porous filter medium baffle; and
the second adjusting member is a nut, which is engaged with a second threaded portion provided on the second draw bar and movable along with the second draw bar, so that the filtering precision of the organic substance filter medium layer and the absorbing filter medium layer are adjusted by moving the second porous filter medium baffle.

14. The gas filtering-buffering device of claim 12, wherein:
the third and forth adjusting member are nuts, which are engaged with third and forth threaded portions and movable along with the first and second draw bars, respectively, so that the filtering precision of the first and second precise filtering layers are adjusted by moving the first and second precise filtering layer baffle.

15. The gas filtering-buffering device of claim 1, wherein further comprising:
a first opening and a second opening provided at the first and second gas buffering cavity; and
a first cover member and a second cover member movably connected to and closing the first and second openings.

16. The gas filtering-buffering device of claim 15, wherein:
sealing members are respectively provided between the first and second openings and the first and second cover members.

17. The gas filtering-buffering device of claim 1, wherein:
each of the first and second-gas filtering units has an integrated structure.

18. The gas filtering-buffering device of claim 1, wherein:
each of the first and second-gas filtering units includes a cartridge filter and a cartridge filter cover connected hermetically with each other, respectively; and
each of the first and second buffering cavities is provided within the cartridge filter cover, respectively.

* * * * *